United States Patent
Bell

(10) Patent No.: US 11,737,444 B2
(45) Date of Patent: Aug. 29, 2023

(54) APPARATUS AND METHOD FOR SOIL STABILIZATION

(71) Applicant: Edward Scott Bell, Indialantic, FL (US)

(72) Inventor: Edward Scott Bell, Indialantic, FL (US)

(73) Assignee: Edward Scott Bell, Indialantic, FL (US)

( * ) Notice: Subject to any disclaimer, the term of this patent is extended or adjusted under 35 U.S.C. 154(b) by 56 days.

(21) Appl. No.: 17/194,402

(22) Filed: Mar. 8, 2021

(65) Prior Publication Data

US 2021/0274767 A1    Sep. 9, 2021

Related U.S. Application Data

(60) Provisional application No. 62/986,739, filed on Mar. 8, 2020.

(51) Int. Cl.
*A01M 21/04*    (2006.01)
*A01M 1/20*    (2006.01)

(52) U.S. Cl.
CPC .......... *A01M 1/2094* (2013.01); *A01M 21/04* (2013.01)

(58) Field of Classification Search
CPC ...... A01M 1/2094; A01M 21/04; F24S 23/70; F24S 23/77; F24S 20/30; G02B 5/08; F22B 1/006; Y02E 10/40; Y02A 40/926; Y02B 40/18

See application file for complete search history.

(56) References Cited

U.S. PATENT DOCUMENTS

| 4,292,957 | A | * | 10/1981 | Golder | F24J 3/02 |
| | | | | | 126/451 |
| 5,959,787 | A | * | 9/1999 | Fairbanks | G02B 17/00 |
| | | | | | 359/726 |
| 8,127,759 | B2 | * | 3/2012 | Nix | F24J 2/00 |
| | | | | | 126/682 |
| 2010/0206303 | A1 | * | 8/2010 | Thorne | F24J 2/10 |
| | | | | | 129/696 |

* cited by examiner

*Primary Examiner* — Joshua E Rodden
*Assistant Examiner* — Henry Hooper Mudd
(74) *Attorney, Agent, or Firm* — Accel IP Law, PLLC; Ferdinand M. Romano

(57) ABSTRACT

An apparatus for solarization of a volume of soil includes a support structure in the form of a frame having a first opening extending therethrough. The apparatus comprises a lid positionable over the frame, a plurality of walls extending under and away from the frame, and an assembly that redirects solar energy attached over the support structure. The lid and walls form a second opening. During operation the support structure is placed on a section of ground and adjusted for solar energy to be directed toward and through the lid. When placed on the ground, the frame, the lid, the walls and the adjoining ground form an enclosed volume that prevents thermal energy from escaping the enclosed volume while directing the solar energy into the volume via the second opening to heat underlying soil.

20 Claims, 18 Drawing Sheets

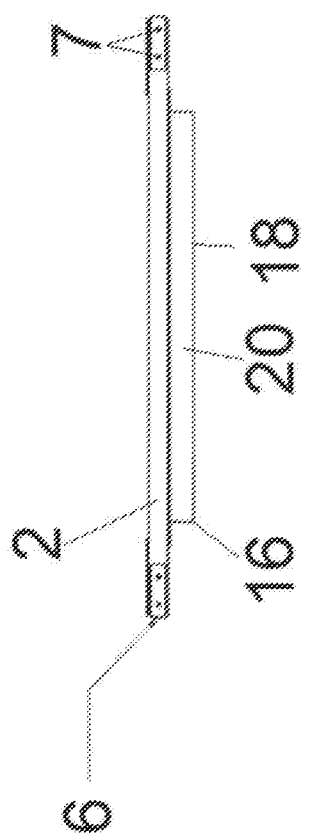

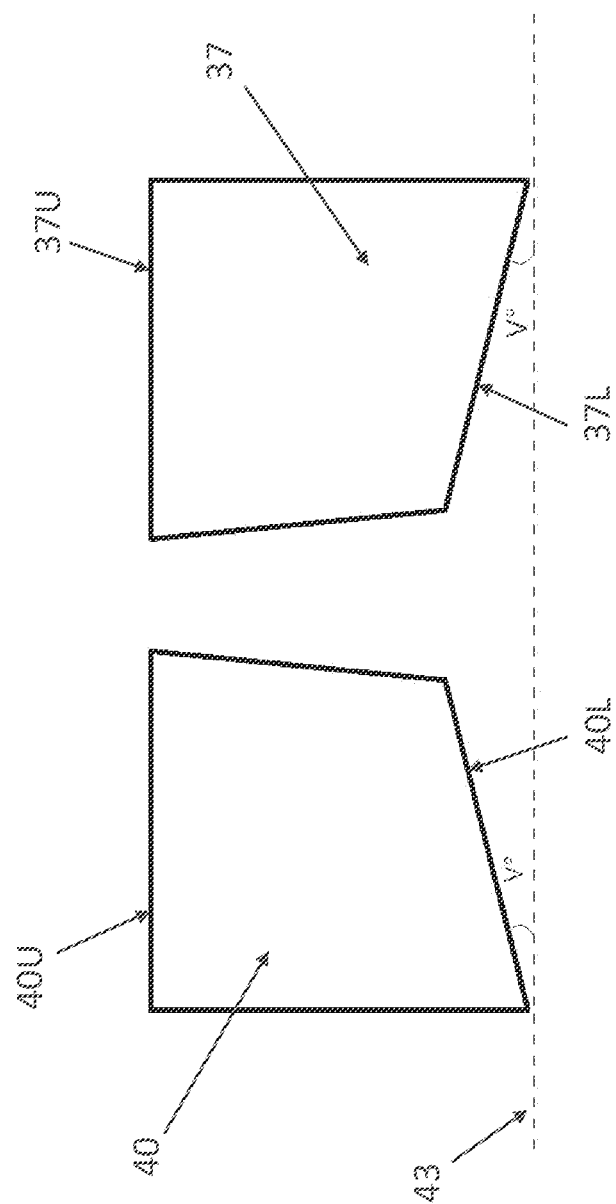

APPARATUS AND METHOD FOR SOIL STABILIZATION

PRIORITY BASED ON RELATED APPLICATION

This application claims the benefit of Untied States Provisional Application Ser. No. 62/986,739 filed Mar. 8, 2020 the disclosure of which is hereby incorporated by reference.

FIELD OF THE INVENTION

The invention relates to solarization and, more specifically, to methods and systems which control pests or weeds in soil. Embodiments of the invention redirect or intensify solar flux to kill weeds, grass, and nematodes up to 152.4 mm (6 inches) below the surface level.

BACKGROUND OF THE INVENTION

Soil Solarization is a chemical-free, environmentally friendly method for mitigating weeds and pests using solar power to increase temperatures of ground soil to a level where life forms are killed. In the past this has generally been done by wetting the ground and putting a plastic cover over the area to trap heat in the underlying soil. It is an environmentally friendly and natural way to create heat. However, the long period required to practice the conventional process may not be considered an attractive alternative to chemical treatments. It may take weeks or even months to satisfactorily kill weeds, insects such as nematodes, and soil-borne pathogens. Moreover, the depth of effective treatment may be limited to only the first few centimeters below the soil surface.

Embodiments of the invention use redirected solar radiation and thereby increase solar flux within a limited heating area. By providing a sufficient thermal seal to an enclosed volume of air positioned over the ground, solarization can elevate and sustain the temperature in a pre-defined volume of ground for effective thermal treatment using only energy of the sun.

[An apparatus and method provide an improved process for soil solarization by receiving solar radiation into a volume and combining direct solar radiation with solar radiation that is redirected with reflective surfaces to enhance radiation directed into an enclosed volume of air over an area of ground. According to one embodiment, a 4 ft$^2$ (0.37 m$^2$) area of ground is heated to 160 degrees Fahrenheit (71.11 Celsius) in about 20 minutes.

Embodiments of the present invention provide a soil treatment apparatus which intensifies solar flux into a volume of air over a predefined area of ground to rapidly elevate the temperature of soil underlying the ground surface at substantially greater depth than other solarization methods. In one embodiment, heat penetrating the soil by direct incidence of solar radiation is intensified with supplemental thermal flux provided by solar reflections directed into an enclosed volume of air over the area of ground or otherwise toward the soil.

An exemplary system comprises a rectangular or square shaped frame having first and second opposing openings. The first opening is covered with a sheet or plate of transparent material. When positioned against the ground, the second opening, also referred to as the lower opening, is along the ground while the sheet covering the first opening serves as the upper frame surface of a rectangular or square chamber that encloses a volume of air. When positioned against the ground, the volume is enclosed as it is bounded by the ground. With the frame so positioned, e.g., with the second opening adjacent or against the ground, solar flux can enter the enclosed volume of air primarily by transmission through the transparent cover and pass through the closed volume toward or into the ground.

As used herein, the term solarization means heating with solar energy and the term solarizer refers to a system or device which elevates the temperature of a region with solar energy.

SUMMARY OF THE INVENTION

Embodiments of the invention include an apparatus for the solarization of a volume of soil or ground by heating a volume above a section of soil or ground. An exemplary solarizer operates along a surface of ground, i.e., in situ. It includes a support structure in the form of an open chamber or volume enclosure which is positionable over and against the ground surface, or positionable over and extending into the ground, to enclose a volume. The illustrated structure includes a volume wall and a volume lid. The wall extends from the lid so that, when the wall is in contact with the ground surface, an enclosure is formed and solar flux may be transmitted through the lid and the wall of the enclosure to the ground surface by preventing the thermal energy present in the volume from escaping into the surrounding air. A subsystem is positioned adjacent the wall and the lid to increase solar flux transmitted into the closed chamber by redirecting solar radiation. A portion of the wall about the first opening comprises an edge region positionable for contact with the ground to limit heat loss from the enclosure along a path extending between the wall and the ground surface. The wall edge may be in the form of a flexible gasket material or seal likened to weather strip; or it may be a relatively narrow edge portion of the wall material such that, when the wall is in contact with the ground, the wall edge can penetrate into the ground surface to limit heat loss from the enclosure. The lid may be a sheet of glass or plastic material transmissive to visible or infrared solar radiation.

By way of example, a support structure, square in shape, frames a first opening. The first opening may be 609.4 mm×609.4 mm (24 in.×24 in.) square, but smaller and larger frames are contemplated for varied consumer and large scale applications. A volume lid covers the first opening. The wall of the support structure may be formed of discrete wall portions like a picture frame or may be a single continuous shape, e.g., injection molded. The wall and lid may create a square shaped enclosing a volume that has first and second openings. When in use the support structure is placed on a section of the ground and soil or plant growth may contact the walls along the second opening, or the walls of the square shaped volume can contact the soil when the support structure are pressed against or into the ground. Ideally, lower edges of the volume walls are continuously pressed against or into the ground during use. Solar energy or radiation is directed through the volume lid which is, preferably, transparent. Once solar energy has passed through the volume lid thermal energy within the volume created by the lid and walls is directed deep into the soil, e.g., to a depth of at least 152.4 mm (6 in.). In one experiment, it was found that soil had reached a temperature of 160 degrees Fahrenheit at up to a depth of 4 inches.

Solar radiation is received into the volume with reflective or diffusive surfaces. These surfaces may be polished surfaces of aluminum plates or may comprise a foil layer on a backing substrate or may be other surfaces which send reflected or diffuse light into the volume. In one embodiment, aluminum sheets of at least 85% reflectivity are needed for optimal operation. During operation of one embodiment, the surfaces are inclined relative to the support structure, e.g., at an angle of at least 60 degrees relative to the ground plane, to produce direct solar radiation between the reflective or diffusive surfaces and the first opening. In another embodiment the angle of reflective surfaces can be fixed at 22.5 degrees or be less than 22.5 degrees relative to the ground plane. In one embodiment, the surfaces may be incorporated into the apparatus in the form of a collapsible assembly that lays flat on the support structure when not in use. The reflective or diffusive surfaces can impart supplemental solar flux into or through the volume of air between volume lid and the ground to elevate the ground temperature to at least 71 C (160 F) in twenty minutes or less, conditions permitting.

The angles of incidence of the reflective or diffusive surfaces can be made fixed angles or may be adjustable, e.g., by use of an angle adjustment insert or other mechanism. An angle adjustment insert can be a triangular shaped wedge and can also comprise a material having a reflective or diffusive surfaces. The angle adjustment insert can be mechanically disconnected and reconnected with other portions of the support structure. The height of the adjustment insert (e.g., corresponding to the base of a right triangle) determines the adjusted angle of incidence of the means of enhancing the flux of solar energy passing into the volume. In lieu of a wedge or triangular shape, a mechanically adjustable plate may be connected to provide variable angles of incidence.

In one embodiment an apparatus is provided which defines a volume above a ground plane for the solarization of an underlying volume of ground. The apparatus includes a support structure having a first opening, a volume lid, and a plurality of volume walls positioned to extend away from the support structure. When the apparatus is above the ground plane, the walls extend toward the ground plane. The plurality of volume walls and the volume lid are attached to the support structure with the volume walls forming a second opening. When the support structure is placed on a section of the ground to receive solar radiation into the volume, the volume lid and volume walls limit escape of thermal energy present in the volume into air surrounding the apparatus and allowing the thermal energy to elevate the ground temperature in the section of the ground via the second opening. The apparatus may include a subassembly positionable to redirect solar radiation toward the volume lid and into the volume. The reflectors may be adjustable to be inclined relative to the support structure at an angle of at least 60 degrees to redirect radiation into the volume. The solar reflectors may be configured as a collapsible reflector assembly and an adjustable angle of incidence may be had with provision of a height of the angle adjustment insert.

According to another embodiment of the invention, an apparatus provided for heating a volume of soil comprises a support structure with a first opening, a volume lid and a plurality of volume walls. The volume walls and the volume lid are attached to the support structure and form a second opening. When the support structure is placed on a section of the ground, the volume lid and volume walls and the ground define a volume of air for which the volume lid and volume walls limit escape of thermal energy into surrounding air and permit the thermal energy to elevate temperature of the section of the ground. In one series of embodiments the apparatus may include a radiation transfer assembly attached to the support structure and comprising a plurality of solar mirrors. When the support structure is placed on the ground the radiation transfer assembly directs solar radiation toward the volume lid.

A method is provided for heating a volume of air above a section of ground. A support structure is placed on a section of ground. Solar radiation is directed onto a volume lid attached to the support structure. The volume of air is encased by the volume lid, the section of ground and a plurality of volume walls. When the support structure is placed on the ground, the volume lid and plurality of volume walls limit escape of thermal energy into the surrounding air. The method may include using a subassembly to direct a solar radiation onto the volume lid. The subassembly may comprise a plurality of reflectors attached to the support structure.

According to another series of embodiments, an apparatus provided for solarization of a volume of soil along a surface of ground includes a support structure in the form of an enclosure positionable over and against the ground surface or over and extending into the ground to enclose a volume. The structure includes a wall and a lid, the wall extending from the lid to a first opening so that when the wall is in contact with the ground surface an enclosure is formed and solar flux may be transmitted through the lid and the wall of the enclosure to the ground surface. A subsystem may be positioned adjacent the wall and the lid to increase solar flux transmitted into the closed chamber by redirecting solar radiation. A portion of the wall about the first opening may include an edge region positionable for contact with the ground to limit heat loss from the enclosure along a path extending between the wall and the ground surface. The edge region may be a relatively narrow portion of the wall such that, when the wall is in contact with the ground, the wall edge can penetrate below the ground surface to limit heat loss from the enclosure. The lid may comprise a sheet of glass or plastic material transmissive to visible or infrared solar radiation.

BRIEF DESCRIPTION OF THE DRAWINGS

The figures depict one or more embodiments of the present invention. The drawings are not necessarily drawn to scale, while emphasis is generally placed upon illustrating principles of the invention.

FIG. 4 is a view taken along a side of the support structure of FIGS. 1-3;

FIG. 17 illustrates, for another embodiment of a solarizer comprising a collapsible three-reflector subassembly, a pair of spaced-apart side reflectors for positioning about a central reflector in the three-reflector assembly.

DETAILED DESCRIPTION OF THE INVENTION

Figure 1:
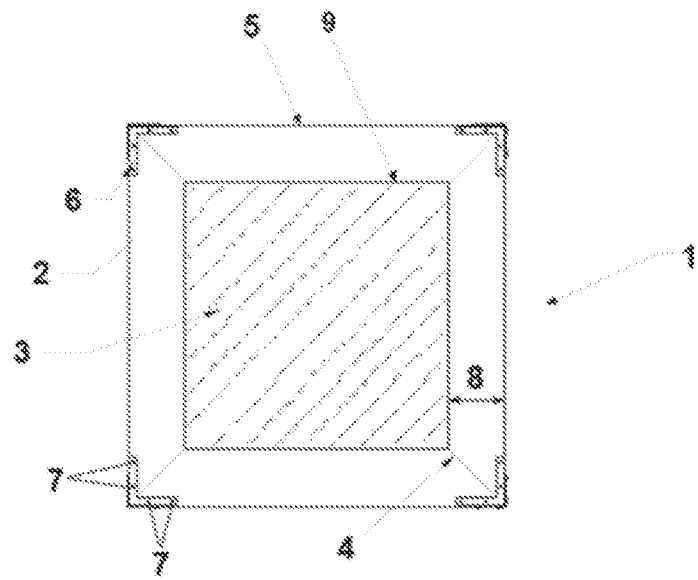
FIG. 1 is a partial overhead view of an embodiment of a solarizer illustrating a support structure in accordance with an embodiment of the present invention.

With referring to the drawings, generally, like reference numerals designate identical or corresponding parts throughout the several views of embodiments of an exemplary apparatus for solarizing an area of soil.

The illustrated embodiments describe an apparatus comprising multiple component parts which can be cast, molded, 3D printed, sintered or machined from fewer pieces or even a single piece of material.

FIGS. 1-4 provide partial views of an embodiment of a solarizer 1 according to the present invention showing a support base 5 without illustrating an optional overlying reflective/diffusive assembly attached to the base. The support base 5, in the form of a square frame, defines the length and width of a first opening 9 through which solar radiation can be received. The base comprises four interconnected trapezoidal support members 2 rendering the first opening 9 in a square shape having, for example, ~610 mm×~610 mm (24 in.×24 in.) sides. The size of the first opening 9 is dependent on the length and width of each support member 2 which are shown as identical and connected to one another to form a square frame, but in other embodiments the support members can increase or decrease in number and be of different shapes or dimensions with respect to one another to form an enclosed polygonal shape or free form.

During use, the solarizer 1 is placed on the ground to provide an enclosure with the first opening 9 facing the sky or sun and a second opening 18 facing the ground. See FIG. 1. The first opening 9 defines the square circumferential boundary of a solarization volume 20. The boundaries of the solarization volume 20 define the space between a lid 3 and the surface of the ground under the support base 5. See FIGS. 3 and 3a. The first opening 9 is covered by the volume lid 3, which can be constructed of transparent or partially transparent material such as plate glass, a sheet or plate of transparent plastic or other structure positioned to receive solar flux within the enclosed solarization volume 20 and enhance transmission of heat toward the ground, via the second opening 18. See FIGS. 3 and 3a. The volume lid 3 is advantageously a square shaped sheet of plexiglass or acrylic glass.

In this embodiment the intersections 4 of the support members 2 are connected by corner brackets 6, and may be made of wood, with the corner brackets 6 connecting adjacent ends of pairs of support members 2 via fastening screws 7. In other embodiments the support members 2 can be made of any suitable material including, but not limited to, metal, plastic, or fabric. In other embodiments the support base 5 can be made with fewer support members 2 of appropriate shape or may be manufactured from a single piece of material, such as by injection molding.

Figure 2:
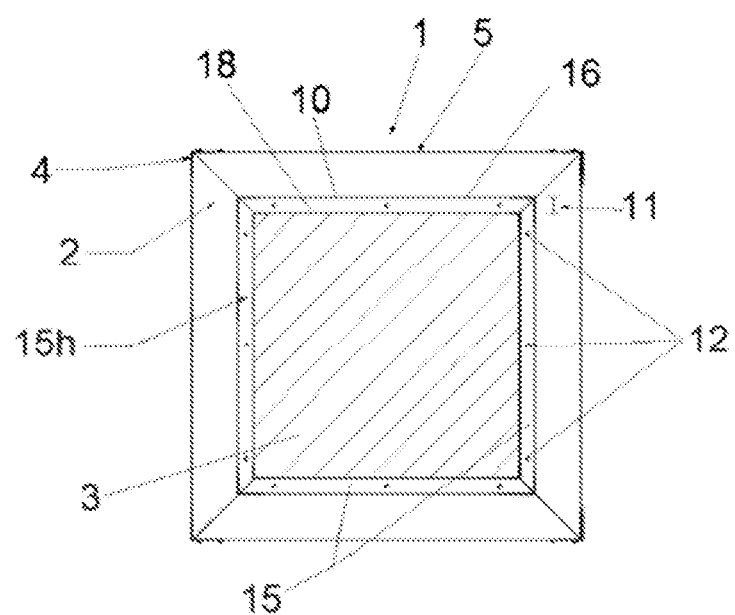
FIG. 2 is an underside view of the solarizer support structure of FIG. 1.
Figure 3:
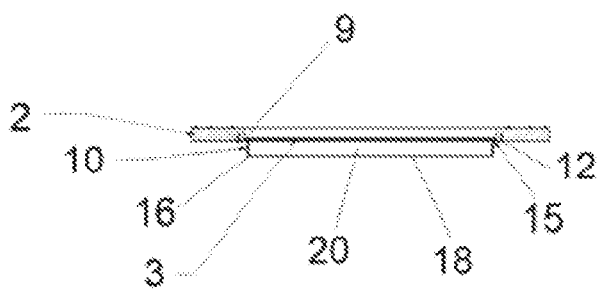
FIG. 3 is a view in cross-section between a pair of opposing sides of the support structure shown in FIGS. 1 and 2.
Figure 3A:
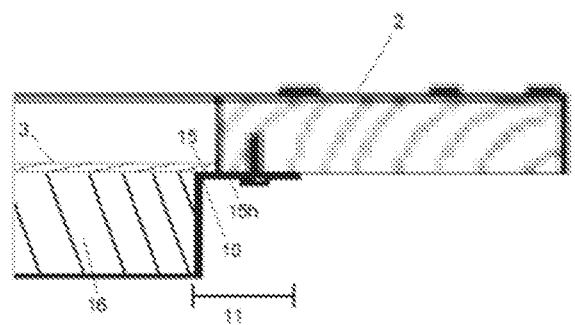
FIG. 3a is a magnified view of a portion of the cross-section seen in FIG. 3.

As can be seen in the underside view of the support base 5 shown in FIG. 2, while positioned for use over a ground plane, the underside of the support base 5 includes a series of L shaped brackets 10 with a first leg, positionable as adjoining vertical walls 16 when extending toward the ground, See FIGS. 3 and 3a. Each L shaped bracket 10 is a 90 degree angle bracket having a second leg 15h which serves as a horizontal segment of a ledge 15 which is coplanar with support base 5. When the underside of the support base 5 faces the ground, the vertical walls 16 of brackets 10 occupy a vertical orientation with respect to the ground plane, and the ledge 15 occupies a horizontal position (e.g., in a plane parallel with the plane of each support member 2). Other embodiments are contemplated where the vertical walls and the function of a ledge may be effected with separate components. The vertical walls may advantageously function to seal the volume along the surface of the ground. The walls can be vertical or any shape or angle capable of functioning to create the volume along the surface of the ground.

The four L-brackets 10 are interconnected and aligned to form a second opening 18, in the exemplary form of a square shape. The second opening 18 may be slightly smaller than the square shape of the first opening 9 formed by the four support members 2.

With each second leg 15h attached to an underside of a different support member 2 (e.g., via screws 12), each second leg 15h extends slightly (e.g., 0.25 in.) beyond the support member 2 to which it is affixed and defines the second opening 18 with the surfaces of the brackets 10 and provides a ledge surface along each support member 2 (but recessed below the upper surface of the adjoining support member 2) to support the lid 3 along each of the four sides of the lid. See FIG. 3a. By way of example, the second leg 15h of each bracket 10 may have a width 11 of one inch with one fourth of the width extending beyond the support member 2 to provide a support ledge 15 extending beyond the support member 2. In combination with the lid 3 and the underlying ground, the four vertical walls 16 serve as walls that bound and enclose the volume 20 between the volume lid 3 and the underlying ground. See FIG. 1. In this manner the volume lid 3 rests on the ledge 15 provided by, for example, one fourth of the leg width which is positioned to extend below and beyond each support member. See FIGS. 3 and 3a.

To summarize, while the second legs 15h of each L-bracket 10 are each attached along a different one of the four interior sides of the square frame that define the first opening 9, the first legs, i.e., the vertical walls 16, extend downward and away from the second opening 18 to press against or into the ground. The L-brackets 10 may be conventional (e.g., angle Aluminum) with one inch (2.54 cm) wide legs. The first leg 16 of each L-bracket 10 is referred to as a vertical wall 16 because of its vertical orientation (when the solarizer is positioned for operation) and functionality with respect to providing a sealed volume along the ground plane when the solarizer is positioned against the ground for solarizing.

Referring again to FIG. 3a, when assembled the second leg 15h of each L-bracket 10 is attached along the surface of a different one of the support members 2 and a portion of each second leg 15h extends below the opening 9 so as to be positioned below the intended position of the volume lid 3 so that when the volume lid 3 is inserted along or through the first opening the lid 3 can rest on the resulting ledge 15 created by the portion of each second leg 15h that extends from the support member to which it is attached.

As can be seen in the views of FIGS. 3 and 3a, volume lid 3 is in contact with the ledge 15 created by the second legs 15h of the L-brackets 10 along the first opening 9 of the support base 5. In this embodiment volume lid 3 may be readily removable from the ledge 15 or may be mechanically attached to the ledge 15 with silicone sealant. Other embodiments can use other mechanical means, such as screws, to fix the volume lid 3 in place. In still other embodiments the volume lid 3 can be attached along the first opening 9 of the support base 5 independently of or in conjunction with a mechanical connection along the ledge 15.

When in use, the support base 5 is positioned on top of a section of soil and may be pressed into the soil such that the vertical walls 16 of L shaped volume wall members, brackets 10, are pressed into the soil to seal the enclosed volume along the surface of the ground. See FIGS. 3 and 3a. The vertical walls 16 or the L-brackets may be made of a variety of reflective or non-reflective materials. In this embodiment, the height of vertical walls 16 of the L-brackets 10 may be limited to 24.5 mm (1 inch) but other heights are possible, such as, for example, ranging from 10 mm (0.40 in.) to 152.4 mm (6 in.) vertical wall heights. The solarization volume 20 is defined by the volume lid 3 and portions of the vertical walls 16 which do not penetrate into the ground. In this embodiment, heat penetration to at least a depth of 152.4 mm (6 inches) is contemplated. In this embodiment, the solarization volume 20 is estimated based on a square shape with a 152.4 mm (6 in.) depth.

The aluminum rail composition enables the vertical walls 16 to be robust for soil penetration and they may also be reflective of radiant energy. The configuration of volume lid 3 and vertical walls 16 creates a sealed solarization volume 20 that retains solar or radiant energy within the solarization volume 20, thereby increasing the rate at which the soil under the solarizar 1 is heated and decreasing the amount of time needed to reach the temperature needed for solarization of the soil. See FIGS. 3 and 3a. In combination with a system of solar reflectors, the sealed solarization volume 20 enables a solarization temperature of ~71 Celsius (160 F) in 20 minutes or less is attainable.

In one series of embodiments, the solarizer 1 comprises a collapsible reflector assembly 22 that enhances receipt of solar flux into the volume 20. See FIGS. 5-9. Referring to FIG. 8, the assembly 22 comprises a first pair of opposing solar reflectors 19 and a second pair of opposing reflectors 21. The assembly occupies a collapsed (e.g., folded) configuration for storage (see FIG. 5) as well as an expanded configuration (see FIG. 6) for operation. The term reflector as used herein refers to a surface which has reflective and/or diffusive properties to redirect solar radiation which might otherwise not be transmitted through the first opening 9.

Figure 5:
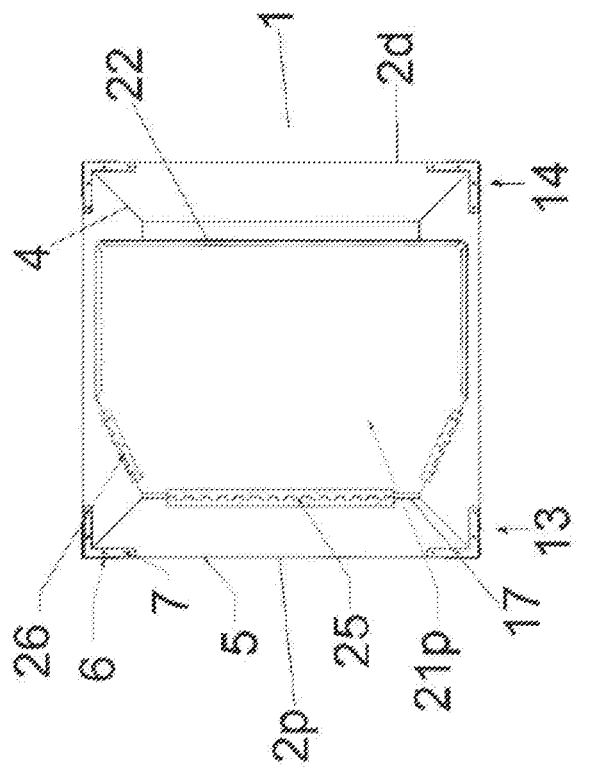
FIG. 5 is an overhead view of the solarizer having adjustable reflective or diffusive surfaces shown with the adjustable surfaces in a collapsed configuration.
Figure 6:
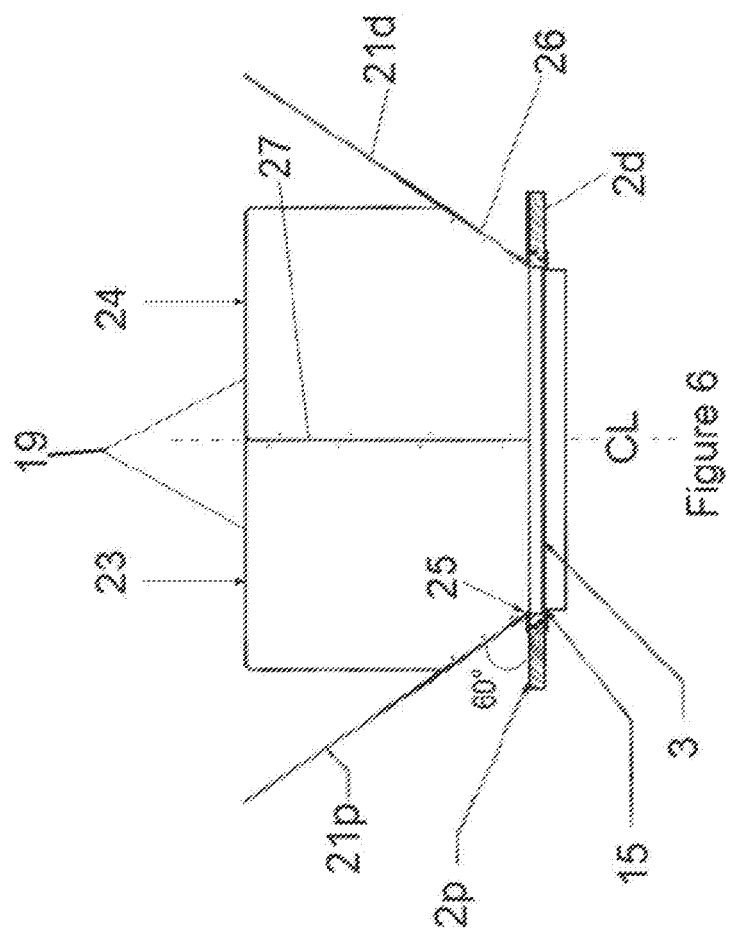
FIG. 6 is a view in cross-section view of the solarizar with the adjustable reflective or diffusive surfaces in an expanded configuration for operation in accordance with the embodiment of FIG. 5.

In the illustrated embodiment of the assembly 22 seen in FIG. 5, a proximal large reflector 21p in the pair of opposing reflectors 21 is hinged to the proximal support member 2p of the two opposing support members 2p, 2d with the assembly hinge 25, and the plurality of reflective surfaces of the assembly 22 connected to one another with a series of additional hinges or flexible joints enabling the assembly 22 to be stretched from the collapsed configuration to the expanded configuration where a distal large reflector 21d in the pair of opposing reflectors 21 is extended away from the assembly hinge 25 to rest on the distal support member 2p of the two opposing support members 2 as seen in FIG. 6.

One in the pair of relatively large opposing reflectors 21 (referred to as the proximal reflector 21p) is hinged to the proximal support member 2p, and the plurality of other reflective surfaces in the assembly 22 are configured with hinges or other flexible, foldable joints enabling the assembly 22 to be stretched from the collapsed or folded configuration to the expanded configuration where the other of the two relatively large reflectors 21 (referred to as the distal reflector 21d) is extended to rest on the distal support member 2d. This arrangement can be implemented in numerous ways. For example, a similar configuration is incorporated into the All American SUN OVEN® product made available by Sun Ovens International, Inc. 38W835 Midan Dr. Elburn, Ill., 60119 USA.

The following description briefly summarizes elements of a foldable reflector design for an embodiment of the collapsible reflector assembly 22. This and other designs apparent to those skilled in the art are useful for increasing solar flux into the solarization volume 20 by redirecting solar rays into the solarization volume 20. Still referring to FIG. 5, the first hinge plate of the assembly hinge 25 is attached along an interior edge 17 of the proximal support member 2p. The second hinge plate of the assembly hinge 25 is attached to the proximal reflector 21p to connect the proximal reflector to the proximal support member 2p, e.g., via screws and or rivets. In the collapsed configuration seen in FIG. 5, the collapsible reflector assembly 22 lays substantially flat on the support base 5.

Each in the second pair of opposing reflectors is a single relatively large reflector 21 hinged for movement about one of the support members. Each in the first pair of opposing reflectors 19 is foldable, comprising, for example, a pair of small hinged foldable reflectors 23, 24 each approximately half the size of one of the large reflectors 21. See FIG. 6. Pairs of the small reflectors 23, 24 forming each of the first reflectors 19 are connected with center hinges 27, to effect folding of each hinge 19 along a center line CL into the collapsed configuration for storage. The pin of the center hinge 27 is positioned on the center line CL. The proximal reflector 21p is connected to adjacent reflectors 19 with corner hinges 26, and the distal reflector 21d is connected to adjacent reflectors 19 with corner hinges 26. See FIG. 7. The locations of the corner hinges 26 along the reflectors is shown as following diagonal lines across the opening 9, along which the four reflectors 19 and 21 are cut and hinged to one another. This results in each otherwise rectangular reflector having a fifth side, along which a corner hinge connects the adjoining reflectors. See FIG. 8. This arrangement of hinges 27 and 26 enables the entire assembly of reflectors to expand and stretch from the collapsed position of FIG. 5 into the expanded configuration of FIG. 6 by lifting, unfolding and stretching the pair of reflectors 19 and the reflector 21d.

With the four support members 2 each having a width 8 and circumferentially arranged to produce the illustrated square shaped support base 5 shown in FIG. 5: the proximal end 13 of the solarizer base (support base 5), relative to an assembly hinge 25, corresponds to the left side of the support base 5; and the distal end 14 of the support base 5, relative to the assembly hinge 25, corresponds to the right side of the support base 5. See FIG. 10. The assembly hinge 25 is positioned on the left side of the support base 5 for rotational connection between the collapsible reflector assembly 22 and the support member 2 on the left side of the support base 5, referred to as the proximal support member 2p. The support member 2 on the right side of the support base 5 is referred to as the distal support member 2d.

In order to transition the reflector assembly 22 from the collapsed configuration to the expanded configuration shown in FIGS. 6-9 the entire collapsed reflector assembly 22 is pivoted about the assembly hinge 25 toward the proximal end 13 of the support base 5. Specifically, the collapsed reflector assembly 22 is rotated with the second plate of the assembly hinge 25 toward the proximal end 13 of the support base 5, i.e., until the angle between the proximal reflector 21p (attached to the second plate of the assembly hinge 25), and the upward facing surface of the proximal support member 2 is reduced from approximately 180 degrees to, for example, 60 degrees as shown in FIG. 6. See, also, FIGS. 7 and 9.

Referring next to the plan view of FIG. 8, as seen from an overhead perspective, the relative positions of the large reflectors 21, interior small reflectors 23, and exterior small reflectors 24 can be seen when the reflector assembly 22 is in the expanded configuration. With the proximal reflector 21p rotated to the 60 degree angle, the distal reflector 21d is moved toward the distal support member 2d. As the distal reflector 21d moves toward the distal end 14 of the support base 5, the center hinges 27 move away from one another, along the center line CL, until each interior small reflector 23 and adjoining exterior small reflector 24 are coplanar about the intermediary center line CL. At this point, with the collapsible reflector assembly 22 in the expanded configuration seen in FIG. 8, the interior portions of the large reflectors 21, interior small reflectors 23, and exterior small reflectors 24 frame the first opening 9 and volume lid 3 located within.

Figure 7:
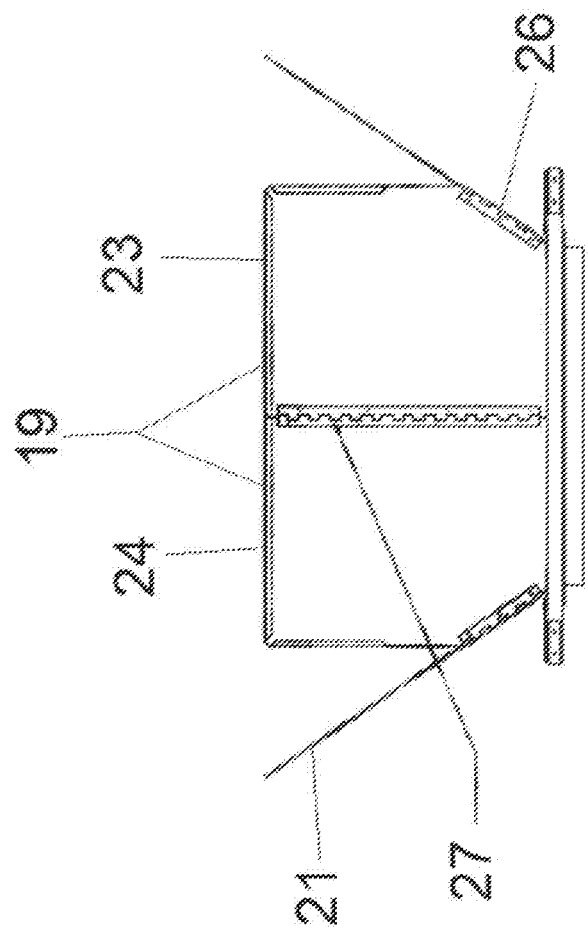
FIG. 7 is a side-view of the solarizar in the expanded configuration in accordance with the embodiment of FIGS. 5 and 6.
Figure 8:
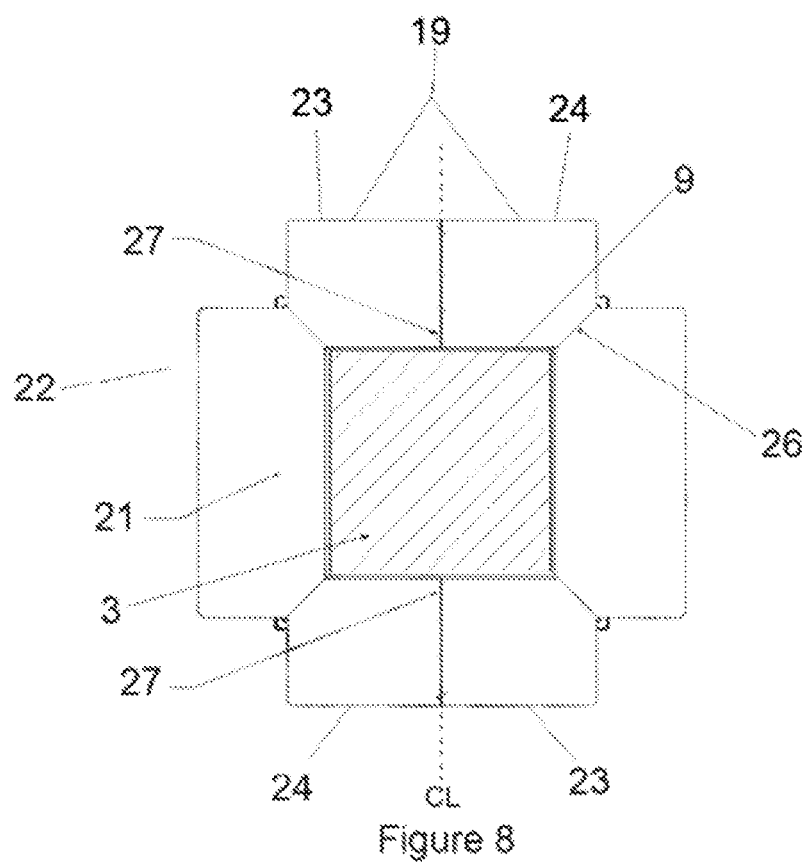
FIG. 8 is an overhead view of the solarizar in the expanded configuration accordance with the embodiment of FIGS. 5-7.
Figure 9:
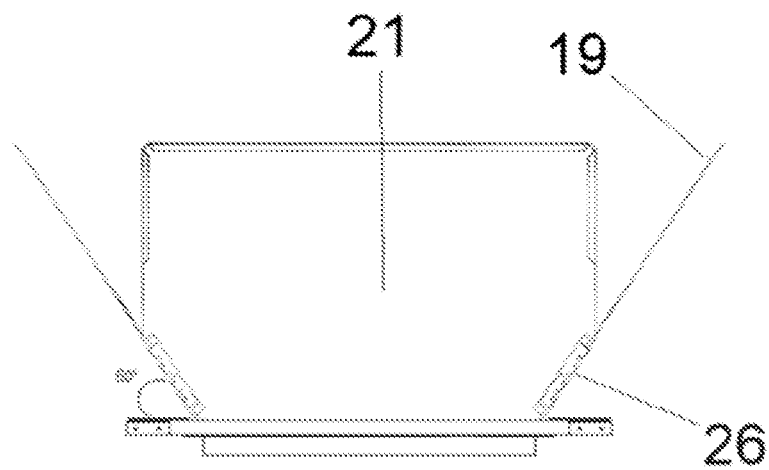
FIG. 9 is another side-view of the solarizar in the expanded configuration in accordance with the embodiment of FIGS. 5-8.

In the expanded configuration of FIG. 8, the angle between reflectors (the large reflectors 21, interior small reflectors 23, and exterior small reflectors 24) and their respective support member 2 is an exemplary 60 degrees; this can be seen in FIGS. 6, 7 and 9. The angular orientation of the reflectors, e.g., 60 degrees, affects the amount of solar flux which is naturally directed into the solarization volume 20. The angular orientation of the reflectors also affects the amount of solar flux which is redirected, e.g., by regular or diffuse reflection, into the solarization volume 20. The redirected flux supplements the amount of thermal radiation which would otherwise pass into the volume lid 3 to further heat the underlying ground. Under ideal conditions this redirected flux can raise the temperature of the soil within the solarization volume 20 to a temperature of ~71 Celsius (160 F) in 20 minutes or less.

Figure 10:
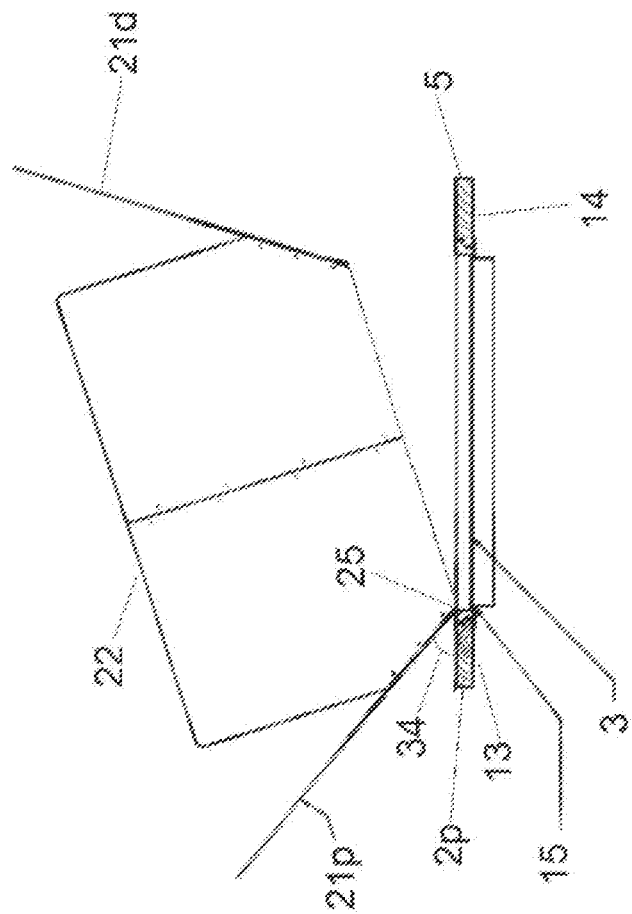
FIG. 10 is another view in cross-section of the solarizer in the expanded configuration illustrating a rotational degree of freedom of the illustrated embodiment.
Figure 11:
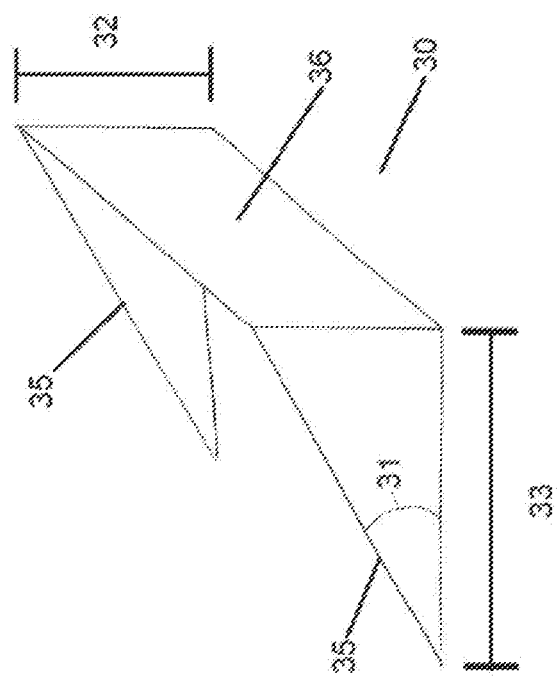
FIG. 11 is a perspective view of an incident angle adjustment insert in accordance with an embodiment of the present invention.

Latitude, time of day, season and ambient conditions influence the amount of solar flux that can be transmitted into the solarization volume 20 with the reflector assembly 22. Embodiments of the present invention allow for adjusting of the angle of incidence on the reflectors 19 and 21 to maximize flux transmitted into the solarization volume 20 with available sun light. As seen in FIG. 10, the reflector assembly 22 may be pivoted about the assembly hinge 25 to adjust the angle 34 between the large reflector 21p and the adjoining proximal support member 2p of the support base 5. With the support base 5 in a horizontal orientation with respect to the underlying ground plane, this feature effects a change in angle of incidence of the solar radiation on the reflectors 19 and 21 with respect to the ground plane and thereby enables optimizing the amount of solar flux entering the solarization volume 20 based on changes in the time of day and year and the latitude. The adjusted angle 34 can be reduced to less than 60 degrees with placement of the angle adjustment insert 30 shown in FIG. 11.

The illustrated angle adjustment insert 30 is wedge shaped, having a rectangular segment 36 connected between two parallel triangular segments 35, creating a U shape when viewed from above. Each triangular segment 35 terminates in a vertex providing an insert angle 31. In this embodiment, the insert length 33 of the triangular segments 35 is equal to the corresponding length of the first opening 9 and the vertex of each triangular segment extends ~610 mm (24 in.) along the proximal end 13 of the support base 5. The insert height 32 of the rectangular segment 36 is determined by the desired insert angle 31. Angle adjustment insert 30 can be cut and bent to shape from one piece of material or may be assembled from various segments. The material used to manufacture the angle adjustment insert 30 can be the same used for the reflectors of the assembly 22 to further enhance throughput to the solarization volume 20.

Figure 12:
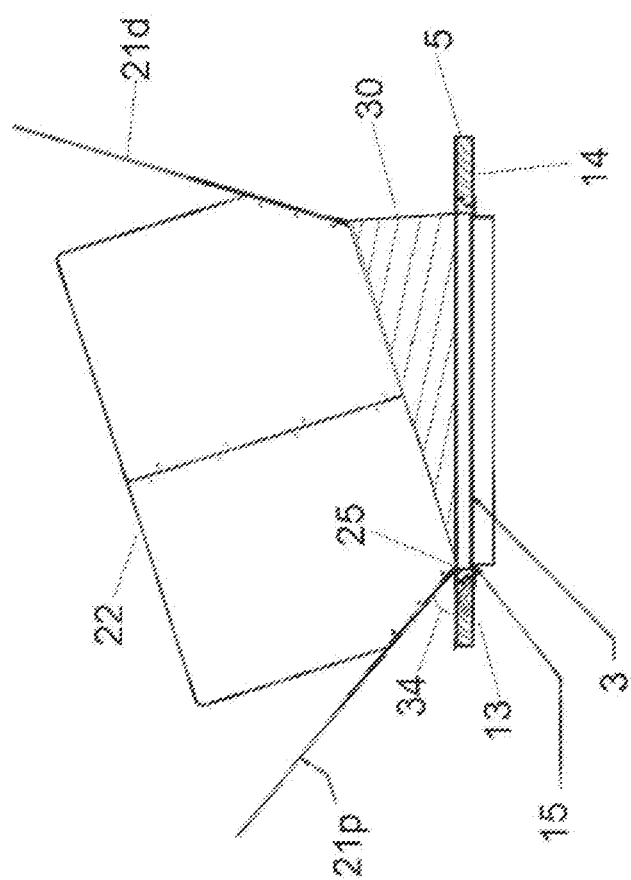
FIG. 12 is a view in cross-section of the embodiment of FIG. 10 incorporating an incident angle adjustment insert.
Figure 13:
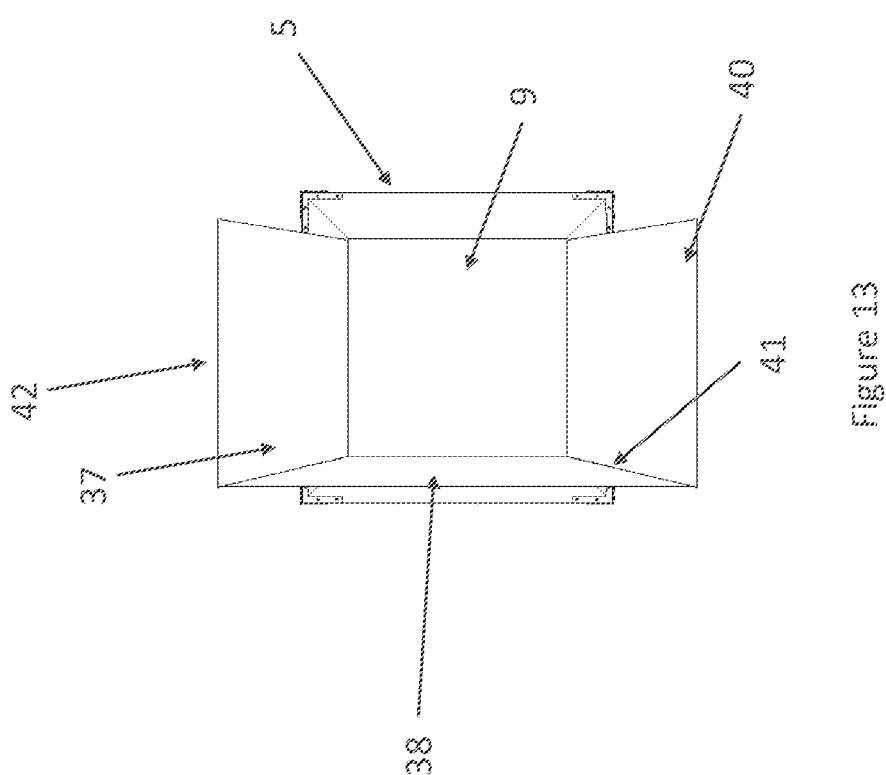
FIG. 13 is an elevation view of another embodiment of the solarizer of FIGS. 1-4 where the support structure has a three-reflector subassembly attached thereto.
Figure 14:
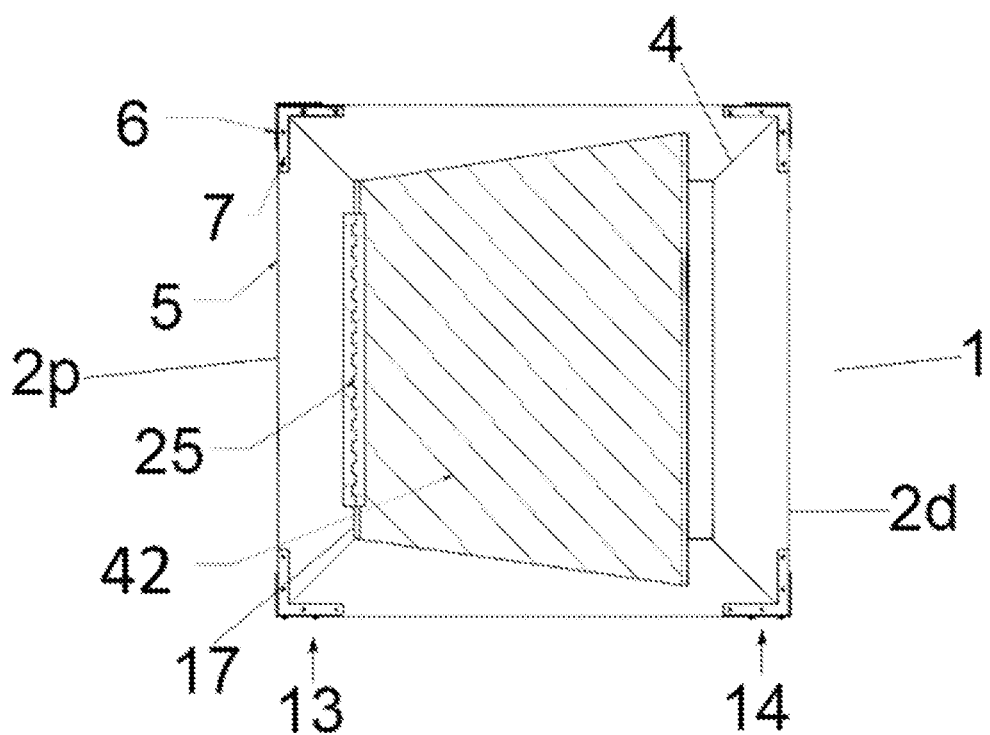
FIG. 14 is an overhead view of the solarizer shown in FIG. 13 with the reflective or diffusive surfaces in a collapsed configuration.

FIG. 12 shows an embodiment of a solarizar 1 that has the collapsible reflector assembly 22 pivoted about the assembly hinge 25 to produce an adjusted angle 34, which is maintained by the addition of angle adjustment insert 30.

Figure 15:
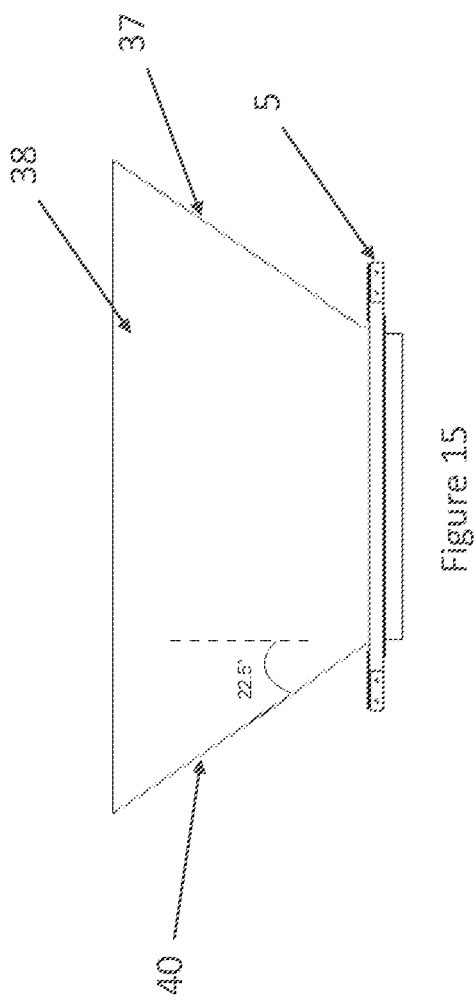
FIG. 15 illustrates, for the solarizer of FIGS. 13 and 14, angle orientations of side reflectors relative to a normal plane.
Figure 16:
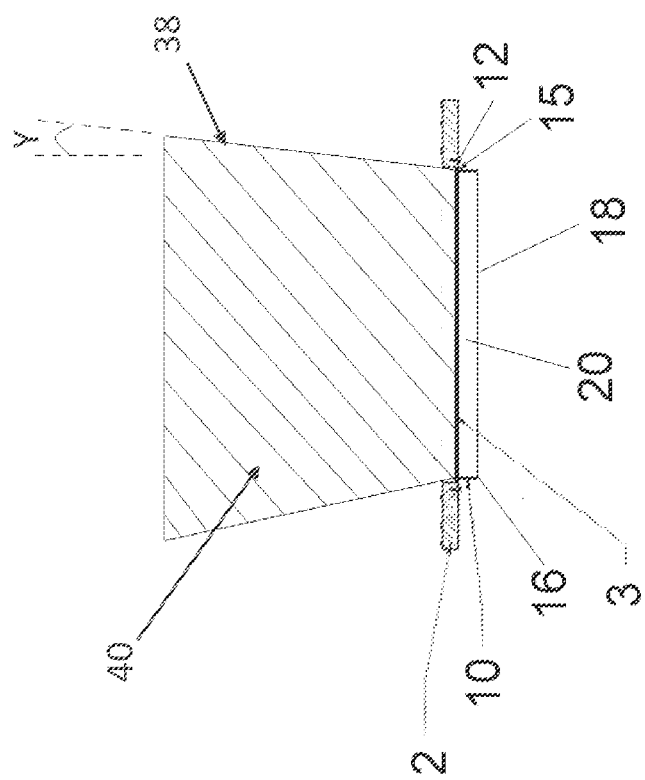
FIG. 16 illustrates for the embodiment of FIG. 13 an angle of orientation for a central reflector relative to the normal plane.

Another embodiment of the invention is shown in FIGS. 13-16 where like components identified in the preceding figures are designated with like reference numerals. As seen in the overhead view of FIG. 13, the support structure 5 (See FIGS. 1 and 2) has a three-reflector subassembly 42 attached thereto. A side reflector 37 is attached to the interior edge 17 of proximal support member 2p via assembly hinge 25. See FIGS. 13 and 14. First and second opposing side edges of a central reflector 38 are attached, respectively, to the affixed side reflector 37 and to a foldable side reflector 40 via hinges 41. See FIG. 13. During operation, foldable side reflector 40 can be attached to the distal support member 2d via any suitable means, such as a screw and wing nut assembly (not shown), to resist deformation or collapse from external forces such as the wind. Alternatively, central reflector 38 can be attached to the support structure 5. The three-reflector subassembly 42 can fold into the flat state seen in FIG. 14 for storage or transportation. The assembly hinge 25 of the affixed side reflector 37 can be attached to the proximal support member 2p such that the pivot of the hinge is within the first opening 9 and attached to or resting on the volume lid 3, as this arrangement allows for the central reflector 38 and foldable side reflector 40 to rest within the first opening 9 and uses the support member 5 as support during operation. See FIGS. 15 and 16. As seen in FIG. 15, the angle of the side reflectors 37 and 40, relative to the normal plane, is 22.5 degrees and the shapes of side reflectors 37 and 40 are reflections of one another when viewed in this orientation. As seen in FIG. 16, the angle Y of the central reflector 38 is ideally less than 22.5 degrees relative to the normal plane. Central reflector 38 has a different shape than the side reflectors 37 and 40 to accommodate folding and unfolding of subassembly 42.

Referring next to the overhead view of FIG. 17, another embodiment of side panels 37 and 40 can be seen as the unattached panels lay flat in a plane. In this view it can be seen that the upper and lower edges 37U, 37L of reflector 37 are not parallel to one another, as the lower edge 37L is angled with respect to a hatched line 43 drawn parallel with the edge 37U. Similarly, the upper and lower edges 40U, 40L of reflector 40 are not parallel to one another, as the lower edge 40L is also angled with respect to the hatched line 43 which is parallel with the edge 40U. The lower edges 37L and 40L are each angled by X° degrees about a vertex, V, with respect to associated upper edge 37U or 40U. Each vertex is at an intersection of a lower edge 37L or 40L and the adjoining panel side edge farthest away from central reflector 38, when assembled. With this arrangement, when the reflectors are configured similar to the embodiment shown in FIGS. 13 and 15, the elevation angle of central reflector 38 is modified to reside at an elevation angle shifted by X° with respect to the ground plane. These embodiments of side panels 37 and 40 allow for a subassembly 42 that does not rest within the first opening 9 of the support structure 5, as the angle X° defines the angle of central panel 38 relative to the normal panel when the side panels 37 and 40 rest on support structure 5. Depending on placement of the assembly hinge 25, one or more of the side panels is attached to the support structure 5, for example via a screw and wing nut combination or any other suitable means. Other means of such angulation alone or in combination with the exemplary angled reflector edges may be provided to set a net elevation angle for the reflector 38.

Several embodiments of the invention have been described. The apparatus is useful in a wide variety of soil applications, including residential and commercial use and the apparatus is scalable in size. The examples used to describe design and operation are not limiting of the scope of the invention. Numerous additional modifications to the disclosed embodiments will be apparent to those skilled in the art. For example, the concepts of the invention can be implemented with a minimum volume or no volume of air between the cover lid 3 and the underlying ground. Accordingly, the scope of the invention is only limited by the claims which now follow.

The claimed invention is:

1. An apparatus for containing a volume of gaseous fluid above a ground plane and transferring thermal energy, into the volume of gaseous fluid, into a mass of soil positioned beneath the ground plane to elevate the temperature of the mass of soil, comprising;
   an enclosure;
   a support structure with a first opening transparent to solar radiation and through which solar radiation can be received into the enclosure, the enclosure comprising
   (i) one or more volume bounding walls configured to surround part of the volume of gaseous fluid and extend away from the support structure so that, when the support structure is positioned over the ground plane, each volume bounding wall extended toward, against or into the mass of soil; and
   (ii) a volume lid positionable about the first opening to isolate the volume of gaseous fluid from other gaseous material located outside or above the support structure and outside the volume bounding walls while the solar radiation passes through the first opening and into the volume of gaseous fluid wherein:
   (a) with the one or more volume bounding walls extending away from the support structure and the volume lid positioned along the first opening to isolate the volume of gaseous fluid from air outside the support structure and outside the volume bounding walls, the one or more volume bounding walls form a second opening, positionable along the ground plane, through which the solar radiation or the thermal energy accumulated within the volume of gaseous fluid can be transferred to the mass of soil, and
   (b) when the support structure and the enclosure are placed over the mass of soil and solar radiation is received through the first opening and transmitted into the enclosure, the volume lid and the one or more volume bounding walls: (i) limit escape of thermal energy present in the volume into air surrounding the apparatus; and (ii) allow transfer of the solar radiation or thermal energy from the enclosure via the second opening to the mass of soil and thereby elevate the temperature of the mass of soil.

2. The apparatus of claim 1 further comprising a subassembly positionable to redirect solar radiation toward the volume lid and into the enclosure.

3. The apparatus of claim 2 wherein the subassembly comprises a plurality of solar reflectors.

4. The apparatus of claim 3 wherein the plurality of reflectors are adjustable to be inclined relative to the support structure at an angle of at least 60 degrees to redirect radiation into the enclosure.

5. The apparatus of claim 1 wherein the volume lid is at least partially transparent and, when the volume wall extends toward, against or into the soil underlying the enclosure, the second opening remains open to provide direct contact between air within the enclosure and the underlying soil.

6. The apparatus of claim 1 wherein, during operation, thermal energy resulting from the solar radiation can penetrate into the soil to a depth of at least 6 inches.

7. The apparatus of claim 3 wherein the plurality of solar reflectors are part of a collapsible reflector assembly.

8. The apparatus of claim 2 wherein reflection caused by the subassembly can raise the temperature of the mass of soil to at least 71 C (160° F.).

9. The apparatus of claim 8 the reflection caused by the subassembly can cause the temperature of the mass of soil to reach the temperature of at least 71 C (160° F.) within twenty minutes.

10. The apparatus of claim 9 wherein the first opening is square in shape having dimensions of 24 inches by 24 inches.

11. The apparatus of claim 7 wherein an angle of incidence of solar flux on a reflector of the collapsible reflector assembly can be adjusted by the use of an angle adjustment insert.

12. The apparatus of claim 11 wherein the angle adjustment insert is wedge shaped.

13. The apparatus of claim 11 wherein the adjustable angle of incidence is determined by a height dimension of the angle adjustment insert.

14. An apparatus for transferring thermal energy from a volume of air therein to soil in earth and underlying the volume of air to elevate a soil temperature, comprising:
   a support structure with a first opening extending therethrough and one or more volume walls configured to form a second opening spaced away from the first opening wherein, when the support structure is positioned over the soil, the one or more volume walls can be positioned to extend toward the soil; and
   a volume lid for covering the first opening while solar radiation passes therethrough wherein:

when the support structure is positioned over the soil, and the volume lid covers the first opening, and with the one or more volume walls positioned against the soil, a combination, which includes the soil, the volume lid and the one or more of the volume walls, collectively provide an enclosure for the volume of air such that escape of thermal energy within the volume of air to air surrounding the enclosure is limited while thermal energy, resulting from the solar radiation passing through the first opening, is transferred through the second opening and into the soil to elevate the soil temperature.

15. The apparatus of claim 14 further comprising a radiation transfer assembly, where the radiation transfer assembly is attached to the support structure; and, when the support structure is placed on the soil, radiation transfer assembly directs solar radiation toward the volume lid.

16. The apparatus of claim 15, where the radiation transfer assembly comprises one or a plurality of solar reflectors.

17. The apparatus of claim 16 where, during operation, a volume of the soil underlying the volume of air can reach a temperature of at least −71 C (160° F.) within twenty minutes.

18. A method of transferring thermal energy from a volume of air to soil in earth and underlying the volume of air to elevate a soil temperature, comprising the steps of:

placing over the soil a support structure (i) containing the volume of air, (ii) having a first opening for passing solar radiation therethrough and (iii) one or more volume walls configured to form a second opening, spaced away from the first opening, for passing solar radiation from the volume of air toward or to the soil; and positioning the support structure to direct solar radiation into the volume with the one or more volume walls providing a seal along the second opening and along an interface region between the volume of air and the underlying soil.

19. The method of claim 18 further comprising the step of covering the first opening with a volume lid and using a subassembly to direct or reflect the solar radiation through the volume lid.

20. The method of claim 18 further including the step of covering the first opening with a volume cover whereby the volume of air is retained within an enclosure comprising the volume cover, the one or more volume walls and a surface region along an interface between the one or more volume walls and the underlying soil that limit escape of thermal energy into air outside the enclosure.

* * * * *